(12) United States Patent
Nakagoshi

(10) Patent No.: US 10,715,696 B2
(45) Date of Patent: Jul. 14, 2020

(54) INFORMATION PROCESSING SYSTEM INCLUDING IMAGE FORMING APPARATUS THAT TRANSMITS IMAGE DATA TO INFORMATION PROCESSING APPARATUS AND INFORMATION PROCESSING APPARATUS THAT DETERMINES STORAGE AREA TO STORE IMAGE DATA, INFORMATION PROCESSING APPARATUS THAT DETERMINES STORAGE AREA TO STORE IMAGE DATA, AND IMAGE FORMING APPARATUS THAT TRANSMITS IMAGE DATA TO INFORMATION PROCESSING APPARATUS

(71) Applicant: KYOCERA DOCUMENT SOLUTIONS INC., Osaka (JP)

(72) Inventor: Yumi Nakagoshi, Osaka (JP)

(73) Assignee: KYOCERA DOCUMENT SOLUTIONS INC., Osaka (JP)

(*) Notice: Subject to any disclaimer, the term of this patent is extended or adjusted under 35 U.S.C. 154(b) by 0 days.

(21) Appl. No.: 16/388,938

(22) Filed: Apr. 19, 2019

(65) Prior Publication Data
US 2019/0327381 A1    Oct. 24, 2019

(30) Foreign Application Priority Data

Apr. 24, 2018   (JP) ................................ 2018-082684

(51) Int. Cl.
*H04N 1/32*    (2006.01)
*H04N 1/00*    (2006.01)

(52) U.S. Cl.
CPC ..... *H04N 1/32133* (2013.01); *H04N 1/00352* (2013.01); *H04N 1/00824* (2013.01);
(Continued)

(58) Field of Classification Search
None
See application file for complete search history.

(56) References Cited

U.S. PATENT DOCUMENTS 5,832,298 A * 11/1998 Sanchez ............. H04N 1/00204
710/8

FOREIGN PATENT DOCUMENTS

JP    2000092299 A  *  3/2000
JP    2001274946 A  * 10/2001
JP    2017-073591 A    4/2017

* cited by examiner

*Primary Examiner* — Thomas D Lee
(74) *Attorney, Agent, or Firm* — Li & Cai Intellectual Property (USA) Office

(57) ABSTRACT

An information processing apparatus capable of communicating with an image forming apparatus via a network, the image forming apparatus being capable of communicating via facsimile, includes a second controller circuit that receives image data transmitted via facsimile, facsimile transmission information including information of one or more items about the facsimile transmission, and additional information including additional information of one or more items about the image data, in association with each other, from the image forming apparatus via the network, and determines a storage area to store the image data based on information of at least one item out of the information of the one or more items included in the facsimile transmission information and/or based on information of at least one item out of the information of the one or more items included in the additional information.

5 Claims, 6 Drawing Sheets

(52) U.S. Cl.
CPC ..... *H04N 1/32021* (2013.01); *H04N 1/32106* (2013.01); *H04N 1/32363* (2013.01)

INFORMATION PROCESSING SYSTEM INCLUDING IMAGE FORMING APPARATUS THAT TRANSMITS IMAGE DATA TO INFORMATION PROCESSING APPARATUS AND INFORMATION PROCESSING APPARATUS THAT DETERMINES STORAGE AREA TO STORE IMAGE DATA, INFORMATION PROCESSING APPARATUS THAT DETERMINES STORAGE AREA TO STORE IMAGE DATA, AND IMAGE FORMING APPARATUS THAT TRANSMITS IMAGE DATA TO INFORMATION PROCESSING APPARATUS

CROSS REFERENCE TO RELATED APPLICATION

This application claims the benefit of Japanese Priority Patent Application JP 2018-082684 filed Apr. 24, 2018, the entire contents of which are incorporated herein by reference.

BACKGROUND OF THE INVENTION

1. Field of the Invention

The present disclosure relates to an image forming apparatus including a facsimile communication device, and an information processing apparatus capable of communicating with the image forming apparatus via a network. The present disclosure further relates to an information processing system including the image forming apparatus and the information processing apparatus.

2. Description of Related Art

There is known a technology of storing (accumulating) image data received via facsimile communication in an information processing apparatus i.e., a server.

A user will see stored image data in the future. So it is desirable that the technology of storing image data received via facsimile communication be more and more user friendly.

SUMMARY OF THE INVENTION

According to an embodiment of the present disclosure, there is provided an information processing system, comprising:

an image forming apparatus capable of communicating via facsimile; and an information processing apparatus capable of communicating with the image forming apparatus via a network, the image forming apparatus including a first controller circuit that transmits image data transmitted via facsimile, facsimile transmission information including information of one or more items about the facsimile transmission, and additional information including additional information of one or more items about the image data, in association with each other, to the information processing apparatus via the network, the information processing apparatus including a second controller circuit that receives the image data, the facsimile transmission information, and the additional information, in association with each other, from the image forming apparatus via the network, and determines a storage area to store the image data based on information of at least one item out of the information of the one or more items included in the facsimile transmission information and/or based on information of at least one item out of the information of the one or more items included in the additional information.

According to an embodiment of the present disclosure, there is provided an information processing apparatus capable of communicating with an image forming apparatus via a network, the image forming apparatus being capable of communicating via facsimile, the information processing apparatus comprising:

a second controller circuit that receives image data transmitted via facsimile, facsimile transmission information including information of one or more items about the facsimile transmission, and additional information including additional information of one or more items about the image data, in association with each other, from the image forming apparatus via the network, and determines a storage area to store the image data based on information of at least one item out of the information of the one or more items included in the facsimile transmission information and/or based on information of at least one item out of the information of the one or more items included in the additional information.

According to an embodiment of the present disclosure, there is provided an image forming apparatus capable of communicating via facsimile and capable of communicating with an information processing apparatus via a network, the image forming apparatus comprising:

a first controller circuit that transmits image data transmitted via facsimile, facsimile transmission information including information of one or more items about the facsimile transmission, and additional information including additional information of one or more items about the image data, in association with each other, to the information processing apparatus via the network, the information processing apparatus including a second controller circuit that receives the image data, the facsimile transmission information, and the additional information, in association with each other, from the image forming apparatus via the network, and determines a storage area to store the image data based on information of at least one item out of the information of the one or more items included in the facsimile transmission information and/or based on information of at least one item out of the information of the one or more items included in the additional information.

These and other objects, features and advantages of the present disclosure will become more apparent in light of the following detailed description of best mode embodiments thereof, as illustrated in the accompanying drawings.

DETAILED DESCRIPTION OF THE PREFERRED EMBODIMENTS

Hereinafter, an embodiment of the present disclosure will be described with reference to the drawings.

1. Outline of Information Processing System

Figure 1:
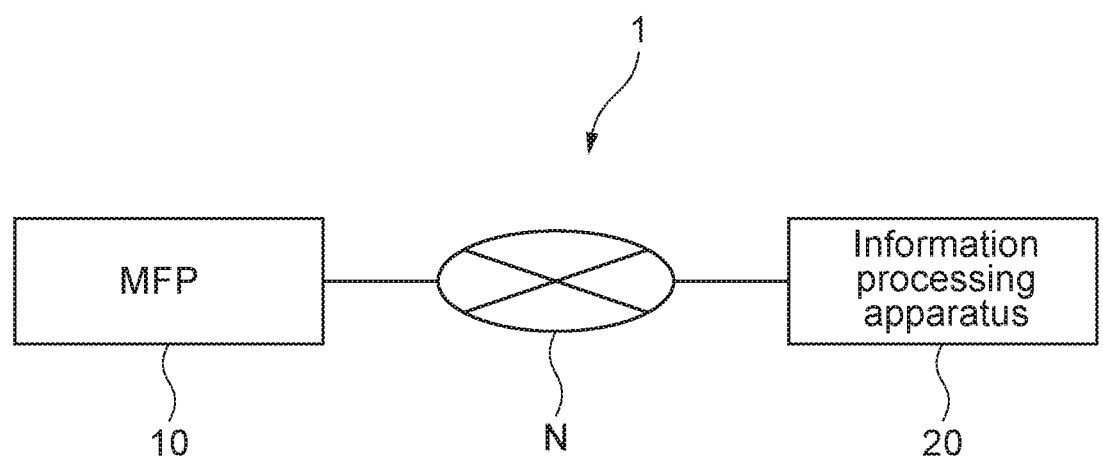
FIG. 1 shows an information processing system according to an embodiment of the present disclosure.

FIG. 1 shows an information processing system according to an embodiment of the present disclosure.

The information processing system 1 includes the image forming apparatus (Multifunction Peripheral, hereinafter referred to as MFP) 10, and the information processing apparatus 20. The MFP 10 and the information processing apparatus 20 are connected to the network N such as the Internet, and are capable of communicating with each other via the network N.

The MFP 10 is capable of communicating via facsimile. The MFP 10 transmits image data, which is transmitted via facsimile, facsimile transmission information, which is information of facsimile transmission, and additional information, which is additional information of the image data, in association with each other, to the information processing apparatus 20 via the network N.

The information processing apparatus 20 receives the image data, the facsimile transmission information, and the additional information, in association with each other, from the MFP 10 via the network N. The information processing apparatus 20 determines a storage area to store the image data based on at least one of the facsimile transmission information and the additional information, and stores the image data in the determined storage area.

2. Hardware Configuration of Image Forming Apparatus

Figure 2:
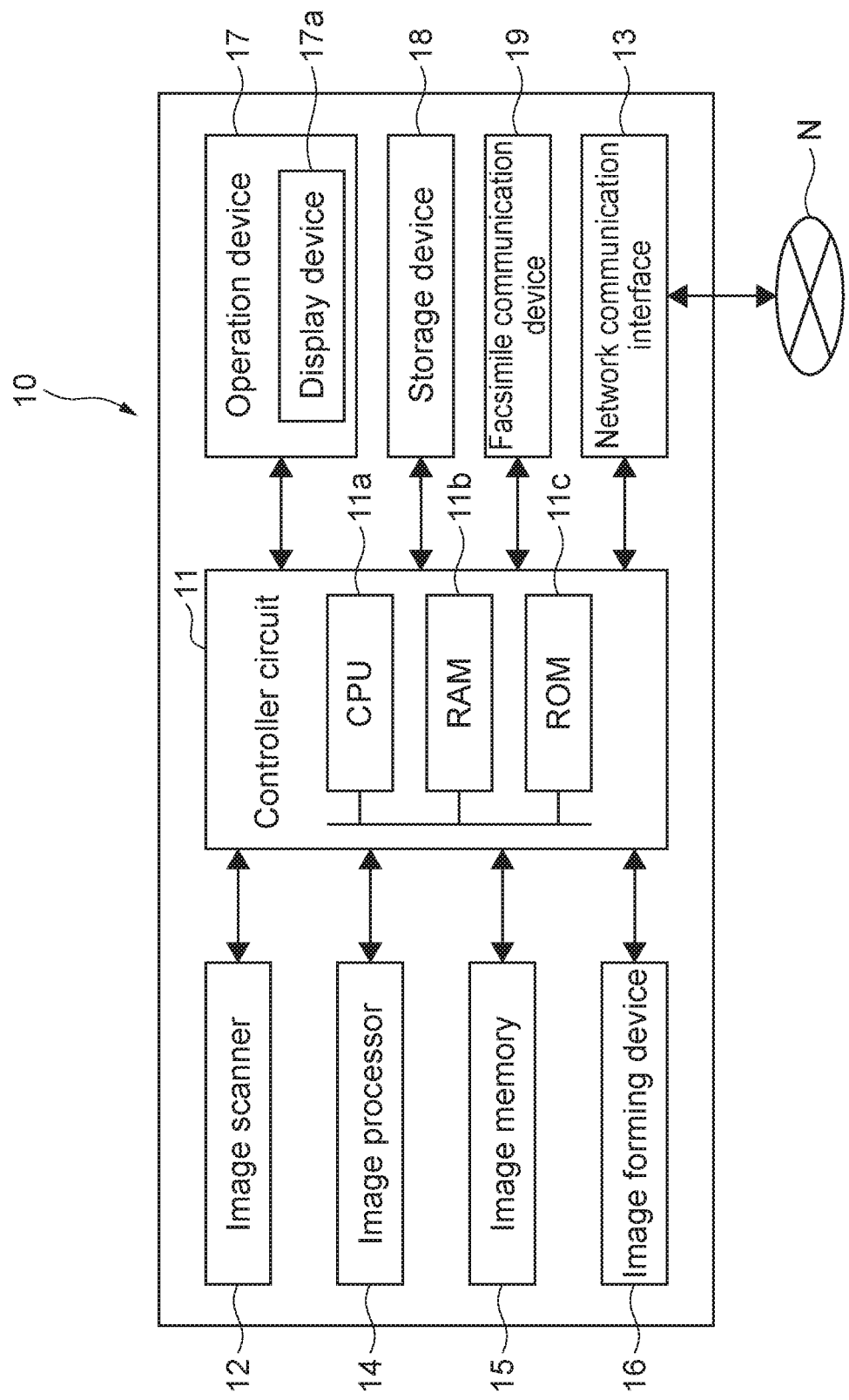
FIG. 2 shows a hardware configuration of an image forming apparatus.

FIG. 2 shows a hardware configuration of an image forming apparatus.

The MFP 10 includes the controller circuit 11. The controller circuit 11 includes the CPU (Central Processing Unit) 11a (processor), the RAM (Random Access Memory) 11b, the ROM (Read Only Memory) 11c (memory), dedicated hardware circuits, and the like and performs overall operational control of the MFP 10. A computer program that causes the MFP 10 to operate as the respective functional units (to be described later) is stored in a non-transitory computer readable recording medium such as a ROM.

The controller circuit 11 is connected to the image scanner 12, the image processor 14, the image memory 15, the image forming device 16, the operation device 17, the storage device 18, the facsimile communication device 19, the network communication interface 13, and the like. The controller circuit 11 performs operational control of the respective devices connected thereto and sends/receives signals and data to/from those devices.

According to job execution instructions input by a user via the operation device 17 or a personal computer (not shown) connected to a network, the controller circuit 11 controls drive and processing of mechanisms requisite for executing operational control of functions such as a scanner function, a printing function, and a copy function.

The image scanner 12 reads an image from a document.
The image processor 14 processes image data.

The image memory 15 includes an area that temporarily stores data of a document image read by the image scanner 12 or data to be printed by the image forming device 16.

The image forming device 16 is a printer that forms an image on paper based on image data read by the image scanner 12, for example.

The operation device 17 includes a touch panel device and an operation key device that accept user's instructions on various operations and processing executable by the MFP 1. The touch panel device includes the display device 17a such as an LCD (Liquid Crystal Display) and an organic EL (Electroluminescence) display including a touch panel. The operation device 17 is a mode of an input unit. The MFP 10 may include, for example, a microphone as a device in which a request is input by a user.

The network communication interface 13 is an interface used for connecting to the network N.

The storage device 18 is a large-volume storage device such as an HDD (Hard Disk Drive) that stores a document image read by the image scanner 12, and the like. Further, the storage device 18 may be a semiconductor memory such as a RAM.

the facsimile communication device 19 includes an encoder/decoder, a codec, and an NCU (Network Control Unit) (not shown), and transmits facsimile via the public switched telephone network.

3. Hardware Configuration of Information Processing Apparatus

Figure 3:
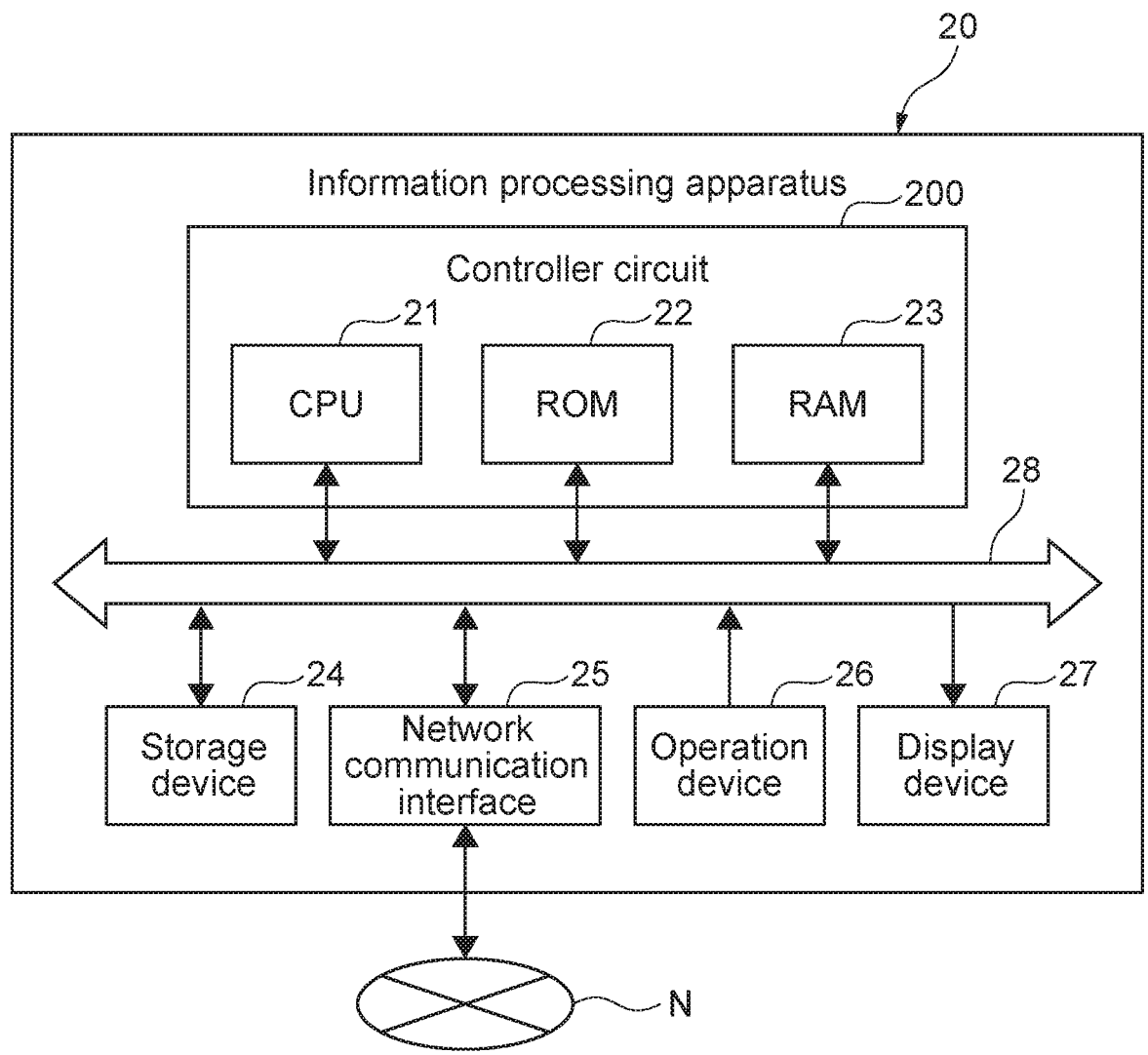
FIG. 3 shows a hardware configuration of an information processing apparatus.

FIG. 3 shows a hardware configuration of an information processing apparatus.

The information processing apparatus 20 includes the CPU 21, the ROM 22, the RAM 23, the storage device 24, the network communication interface 25, the operation device 26, and the display device 27, and the bus 28 connecting them to each other.

The controller circuit 200 includes the CPU 21, the ROM 22, and the RAM 23. The CPU 21 loads information processing programs stored in the ROM 22 in the RAM 23 and executes the information processing programs. The ROM 22 stores programs executed by the CPU 21, data, and the like nonvolatile. The ROM 22 is an example of a non-transitory computer readable recording medium.

The storage device 24 is a large-volume record medium such as an HDD (Hard Disk Drive) or an SSD (Solid State Drive).

The network communication interface 25 is an interface used for connecting to the network N.

The operation device 26 includes a touch panel, a keyboard, a mouse, various switches, and the like. The operation device 26 detects operations input by a user, and outputs information to the CPU 21.

The display device 27 includes an LCD, an organic EL display, or the like. The display device 27 executes arithmetic processing based on information received from the CPU 21, and displays generated image signals on a display. The display device 27 may be an external display device.

4. Functional Configuration of Information Processing System

Figure 4:
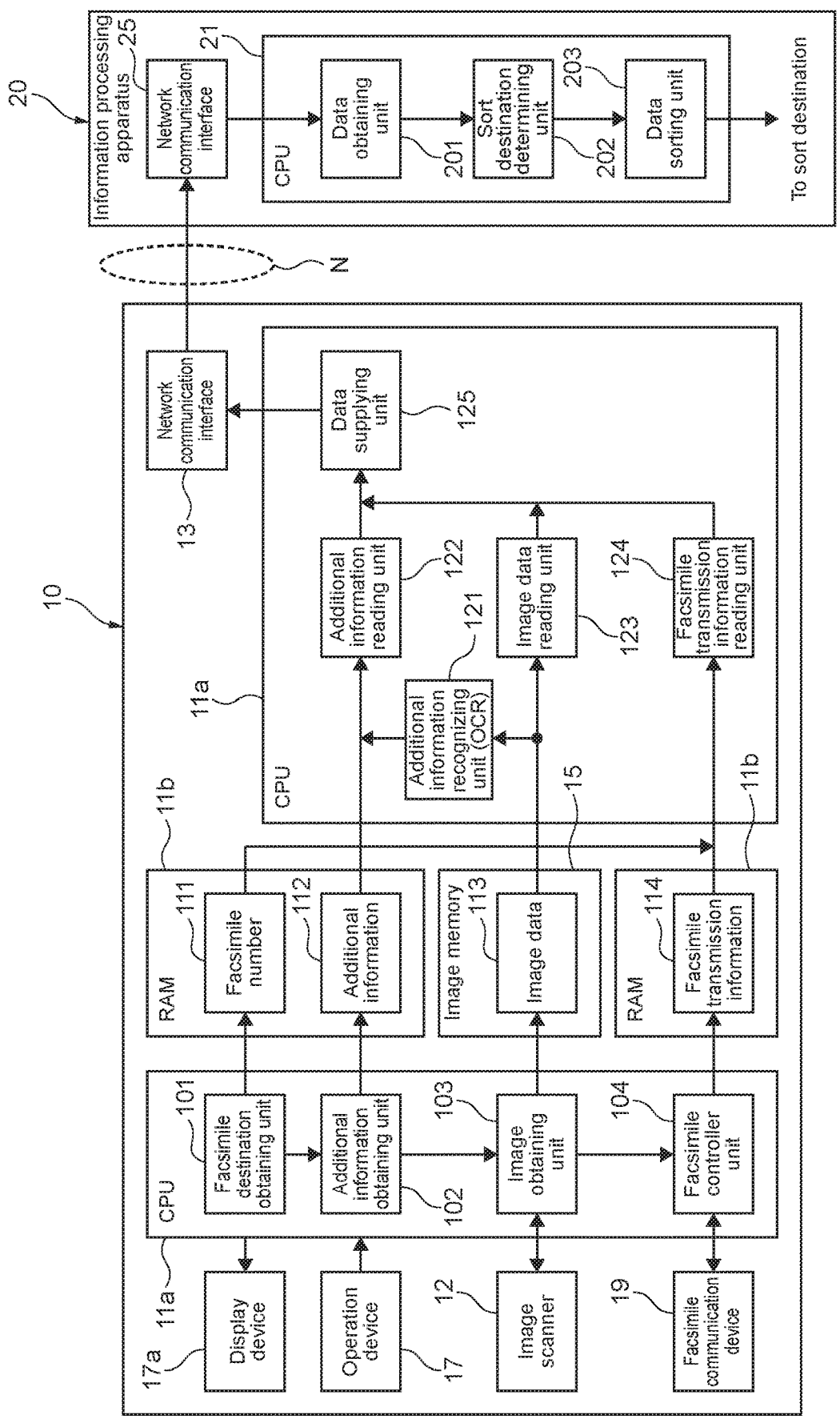
FIG. 4 shows a functional configuration of the information processing system.

FIG. 4 shows a functional configuration of the information processing system.

In the controller circuit 11 (first controller circuit) of the MFP 10, the CPU 11a loads an information processing program, which is recorded in the ROM 11c, in the RAM 11b and executes the information processing program to thereby operate as the facsimile destination obtaining unit 101, the additional information obtaining unit 102, the image obtaining unit 103, the facsimile controller unit 104, the additional information recognizing unit 121, the additional information reading unit 122, the image data reading unit 123, the facsimile transmission information reading unit 124, and the data supplying unit 125.

The facsimile destination obtaining unit 101 generates the facsimile number 111 of a destination of facsimile transmission based on input information input in the operation device 17 by a user, and writes the facsimile number 111 in the RAM 11b.

The additional information obtaining unit 102 generates the additional information 112 based on input information input in the operation device 17 by the user, and writes the additional information 112 in the RAM 11b.

The image obtaining unit 103 obtains the image data 113, which has a predetermined resolution and is read from a document by the image scanner 12, and writes the image data 113 in the image memory 15.

The facsimile controller unit 104 controls the facsimile communication device 19 to transmit the image data 113 to the destination specified by the facsimile number 111 via facsimile. The facsimile controller unit 104 writes the facsimile transmission information 114 in the RAM 11b.

The additional information recognizing unit 121 reads additional information from the image data 113 by executing optical character recognition (OCR) on at least a part of the image data 113 read from the image memory 15.

The additional information reading unit 122 obtains the additional information optically read by the additional information recognizing unit 121, reads the additional information 112 from the RAM 11b, and selects one of those two of the additional information.

The image data reading unit 123 reads the image data 113 from the image memory 15.

The facsimile transmission information reading unit 124 reads the facsimile transmission information 114 and the facsimile number 111 from the RAM 11b.

The data supplying unit 125 controls the network communication interface 13 to transmit the image data, the facsimile transmission information, and the additional information, in association with each other, to the information processing apparatus via the network N.

In the controller circuit 200 (second controller circuit) of the information processing apparatus 20, the CPU 21 loads an information processing program, which is recorded in the ROM 22, in the RAM 23 and executes the information processing program to thereby operate as the data obtaining unit 201, the sort destination determining unit 202, and the data sorting unit 203.

The data obtaining unit 201 controls the network communication interface 25 to receive the image data, the facsimile transmission information, and the additional information, in association with each other, from the MFP 10 via the network N.

The sort destination determining unit 202 determines a storage area (sort destination) to store the image data based on at least one of the facsimile transmission information and the additional information.

The data sorting unit 203 supplies the image data, the facsimile transmission information, and the additional information, in association with each other, to the determined storage area (sort destination).

5. Operation of Image Forming Apparatus

Figure 5:
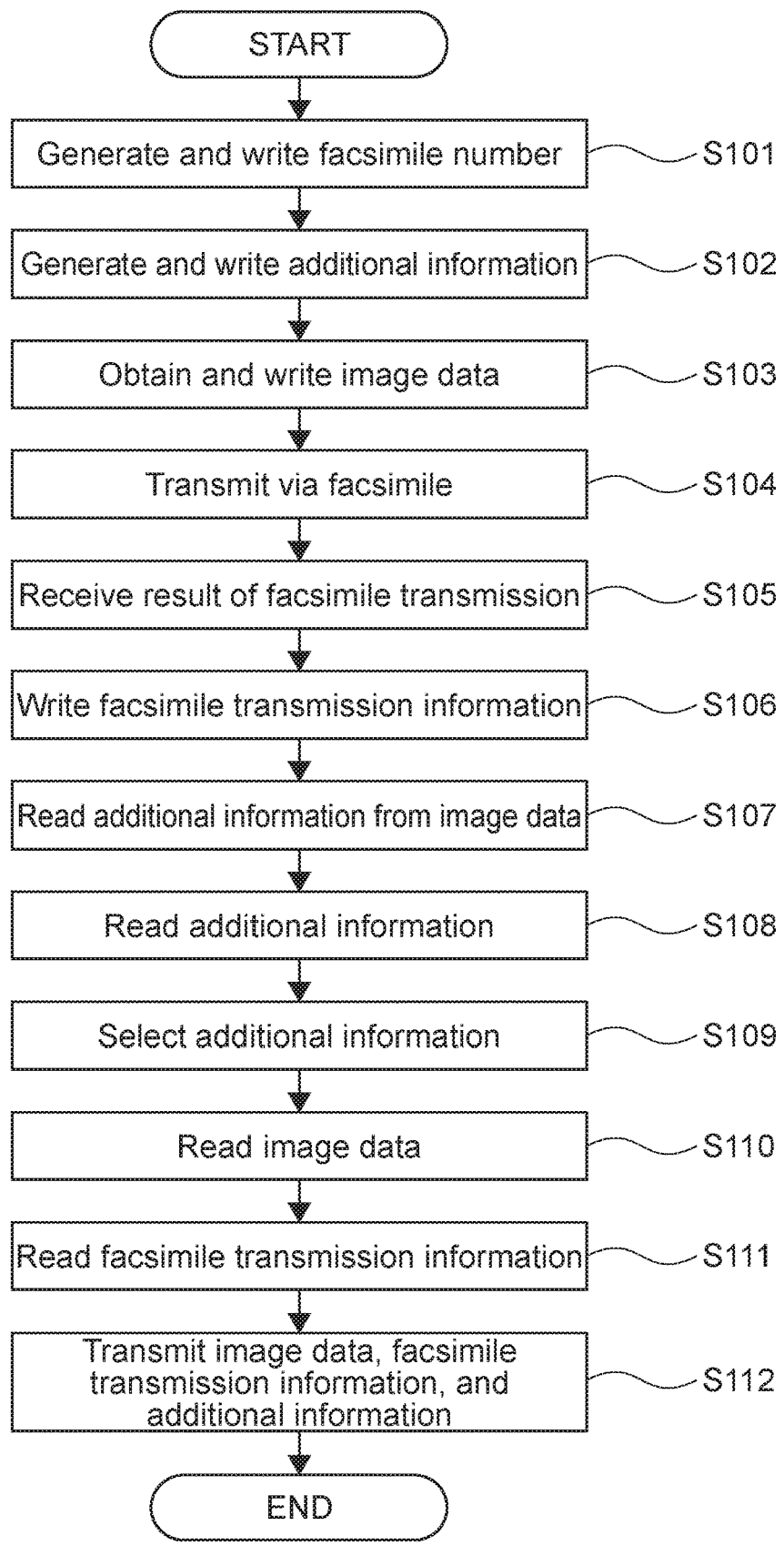
FIG. 5 shows an operational flow of the image forming apparatus.

FIG. 5 shows an operational flow of the image forming apparatus.

The facsimile destination obtaining unit 101 of the MFP 10 displays a message, which asks a user to specify a facsimile number of a destination of facsimile transmission, on the display device 17a. The facsimile destination obtaining unit 101 generates a facsimile number of a destination of facsimile transmission based on input information input in the operation device 17 by the user. The facsimile destination obtaining unit 101 writes the generated facsimile number 111 in the RAM 11b (Step S101).

Next, the additional information obtaining unit 102 displays a message, which asks the user to specify additional information, on the display device 17a. The "additional information" includes information indicating at least one of a destination person's name of the facsimile transmission, a destination's name of the facsimile transmission, a type of the image data, a sender (user) person's name of the facsimile transmission, and a name of a workflow about the image data. The additional information obtaining unit 102 generates additional information based on input information input in the operation device 17 by the user. The additional information obtaining unit 102 writes the generated additional information 112 in the RAM 11b. Alternatively, if no input information is input in the operation device 17 by the user, the additional information obtaining unit 102 generates no additional information, and writes no additional information in the RAM 11b (Step S102).

Next, the image obtaining unit 103 displays a message, which asks the user to specify the image data to be transmitted via facsimile, on the display device 17a. Typically, the image obtaining unit 103 obtains image data, which has a predetermined resolution and is read from a document by the image scanner 12, based on input information input in the operation device 17 by the user. Typically, the resolution of image data transmitted via facsimile is set lower than the resolution of scanned data stored in a local storage of the MFP 10 or transmitted via a network. The image obtaining unit 103 writes the obtained image data 113 in the image memory 15 (Step S103).

Next, the facsimile controller unit 104 displays a message, which asks the user to specify start of facsimile transmission, on the display device 17a. The facsimile controller unit 104 controls the facsimile communication device 19 to transmit the image data 113 to the destination specified by the facsimile number 111 via facsimile (Step S104). The facsimile controller unit 104 receives a success or failure result of the facsimile transmission via the facsimile communication device 19 (Step S105). The facsimile controller unit 104 writes the facsimile transmission information 114 in the RAM 11b. The facsimile transmission information 114 includes information indicating at least one of a success or failure result of the facsimile transmission, date and time of the facsimile transmission, and number of sheets of the facsimile transmission (Step S106). The process of the facsimile transmission has been described above. After the end of the process of the facsimile transmission, next, the following process will be executed.

The additional information recognizing unit 121 reads the image memory 15 from the image data 113. The additional information recognizing unit 121 reads additional information from the image data 113 by executing optical character recognition (OCR) on at least a part of the image data 113 (Step S107). "At least a part of the image data 113" means, for example, image data of the first sheet (first page). The reason is as follows. In many cases, image data of the first sheet (first page) is image data of a cover letter or the like.

So it is expected that the image data of the first sheet (first page) includes more additional information than image data of the following pages.

The additional information reading unit 122 obtains the additional information optically read by the additional information recognizing unit 121. Further, the additional information reading unit 122 reads the additional information 112 from the RAM 11b (i.e., additional information generated based on input information input in the operation device 17 by the user) (Step S108). Note that, as described above, if no input information is input in the operation device 17 by the user, the RAM 11b records no additional information 112. The additional information reading unit 122 compares, for each item, the additional information optically read from the image data (hereinafter referred to as "image-data-additional-information") with the additional information generated based on the input information input in the operation device 17 by the user (hereinafter referred to as "input-additional-information"). The "item" is, in this example, at least one of a destination person's name of the facsimile transmission, a destination's name of the facsimile transmission, a type of the image data, a sender (user) person's name of the facsimile transmission, and a name of a workflow about the image data.

If the image-data-additional-information of a certain item is the same as the input-additional-information of the certain item, the additional information reading unit 122 selects the common additional information for that item. Meanwhile, if one of the image-data-additional-information or the input-additional-information of a certain item exists and the other does not exist, the additional information reading unit 122 selects the existing additional information for that item. Meanwhile, if the image-data-additional-information of a certain item is different from the input-additional-information of the certain item, the additional information reading unit 122 selects, with a higher priority, the image-data-additional-information for that item. The reason is as follows. The image-data-additional-information is likely to be relatively accurate since the image-data-additional-information is based on OCR. Meanwhile, the input-additional-information is likely to be relatively inaccurate since a user's input error may occur. The additional information reading unit 122 selects additional information for each of all the items in the aforementioned way (Step S109).

The image data reading unit 123 reads the image data 113 from the image memory 15 (Step S110).

The facsimile transmission information reading unit 124 reads the facsimile transmission information 114 and the facsimile number 111 from the RAM 11b (Step S111). In the following description, the "facsimile transmission information" includes a facsimile number.

The data supplying unit 125 controls the network communication interface 13 to transmit the image data, the facsimile transmission information, and the additional information, in association with each other, to the information processing apparatus 20 via the network N (Step S112).

6. Operation of Information Processing Apparatus

Figure 6:
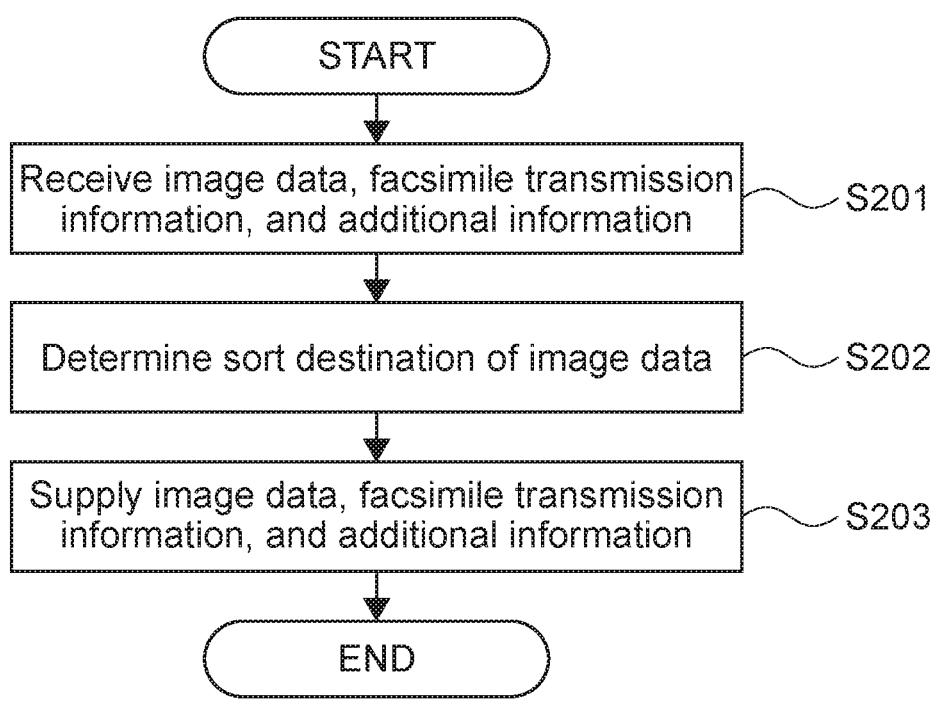
FIG. 6 shows an operational flow of the information processing apparatus.

FIG. 6 shows an operational flow of the information processing apparatus.

The data obtaining unit 201 of the information processing apparatus 20 controls the network communication interface 25 to receive the image data, the facsimile transmission information, and the additional information, in association with each other, from the MFP 10 via the network N (Step S201).

The sort destination determining unit 202 determines a storage area (sort destination) to store the image data based on information of at least one item out of the information of the plurality of items included in the facsimile transmission information and/or based on information of at least one item out of the information of the plurality of items included in the additional information (Step S202). The "storage area (sort destination) to store the image" means the local storage device 24 (FIG. 3) of the information processing apparatus 20, a storage device (not shown) directly connected to the information processing apparatus 20, a storage device (not shown) connected to the information processing apparatus 20 via the network N, or the like. Alternatively, the "storage area (sort destination) to store the image" means a folder or the like of one of them.

The "information of at least one item out of the information of the plurality of items included in the facsimile transmission information and/or based on information of at least one item out of the information of the plurality of items included in the additional information" means, strictly speaking, information of at least one item out of the plurality of items included in the facsimile transmission information, information of at least one item out of the plurality of items included in the additional information, or information of at least one item out of the plurality of items included in the facsimile transmission information and information of at least one item out of the plurality of items included in the additional information. The sort condition may be arbitrarily set depending on needs of a user (sender or administrator of the MFP 10).

The data sorting unit 203 writes (where sort destination is local) the image data, the facsimile transmission information, and the additional information, in association with each other, in the determined storage area (sort destination). Alternatively, the data sorting unit 203 transmits (where sort destination is not local) the image data, the facsimile transmission information, and the additional information, in association with each other, in the determined storage area (sort destination) (Step S203).

7. Conclusion

Typically, when a document (paper) is scanned and the resultant image data is transmitted via facsimile, the image data is merely stored in a volatile image memory temporarily, and is not stored in a nonvolatile storage device. As a result, the following problem may occur.

(1) Where a user (sender) wishes to keep a copy of facsimile transmission, the user has to physically keep the document (paper) itself, and to sort such copies is burdensome.

(2) Typically, the resolution of the image data transmitted via facsimile is low. However, typically, a user (sender) has no chance to see image data actually transmitted via facsimile (in other words, image data that a receiver actually sees). As a result, typically, the user (sender) may not know the clarity of text included the image data that a receiver actually sees, and the image quality of graphics included that image data.

To the contrary, according to the present embodiment, the MFP 10, which transmitted image data via facsimile, transmits the image data transmitted via facsimile, facsimile transmission information, and additional information, in association with each other, in the information processing apparatus 20. The information processing apparatus 20 determines a storage area to store the image data based on at least one of the received facsimile transmission information and additional information.

As a result, it is possible to sort image data transmitted via facsimile depending on needs of a user and to store the image data automatically from the viewpoint of the user. Further, since image data (typically, which has low resolution) transmitted via facsimile is stored, a user (sender) has a chance to see the image data actually transmitted via facsimile (in other words, image data that a receiver actually sees). As a result, the user (sender) has a chance to know the clarity of text included the image data that a receiver actually sees, and the image quality of graphics included that image data.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing system, comprising:
    an image forming apparatus capable of communicating via facsimile; and
    an information processing apparatus capable of communicating with the image forming apparatus via a network,
    the image forming apparatus including
    an input unit that receives input information input by a user, and outputs the input information to a first controller circuit, and
    the first controller circuit that transmits image data transmitted via facsimile, facsimile transmission information including information of one or more items about the facsimile transmission, and additional information including additional information of one or more items about the image data, in association with each other, to the information processing apparatus via the network,
    the information processing apparatus including a second controller circuit that
        receives the image data, the facsimile transmission information, and the additional information, in association with each other, from the image forming apparatus via the network, and
        determines a storage area to store the image data based on information of at least one item out of the information of the one or more items included in the facsimile transmission information and/or based on information of at least one item out of the information of the one or more items included in the additional information, wherein
    the first controller circuit of the image forming apparatus
        reads the additional information from the image data by executing optical character recognition on at least a part of the image data,
        generates the additional information based on the input information input in the input unit by the user, and
        where additional information of a certain item included in the additional information read from the image data is different from additional information of the certain item included in the additional information generated based on the input information input in the input unit, transmits the additional information of the certain item included in the additional information read from the image data, with a higher priority, to the information processing apparatus.

2. The information processing system according to claim 1, wherein
    the information of the one or more items included in the facsimile transmission information is information indicating at least one of a facsimile number of a destination of the facsimile transmission, a success or failure result of the facsimile transmission, date and time of the facsimile transmission, and number of sheets of the facsimile transmission.

3. The information processing system according to claim 1, wherein
    the information of the one or more items included in the additional information is information indicating at least one of a destination person's name of the facsimile transmission, a destination's name of the facsimile transmission, a type of the image data, a sender person's name of the facsimile transmission, and a name of a workflow about the image data.

4. An information processing apparatus capable of communicating with an image forming apparatus via a network, the image forming apparatus being capable of communicating via facsimile, the image forming apparatus including an input unit that receives input information input by a user, and outputs the input information to a first controller circuit, and the first controller circuit that transmits image data transmitted via facsimile, facsimile transmission information including information of one or more items about the facsimile transmission, and additional information including additional information of one or more items about the image data, in association with each other, to the information processing apparatus via the network,
    the information processing apparatus comprising:
    a second controller circuit that
        receives image data transmitted via facsimile, facsimile transmission information including information of one or more items about the facsimile transmission, and additional information including additional information of one or more items about the image data, in association with each other, from the image forming apparatus via the network, and
        determines a storage area to store the image data based on information of at least one item out of the information of the one or more items included in the facsimile transmission information and/or based on information of at least one item out of the information of the one or more items included in the additional information, wherein
    the first controller circuit of the image forming apparatus
        reads the additional information from the image data by executing optical character recognition on at least a part of the image data,
        generates the additional information based on the input information input in the input unit by the user, and
        where additional information of a certain item included in the additional information read from the image data is different from additional information of the certain item included in the additional information generated based on the input information input in the input unit, transmits the additional information of the certain item included in the additional information read from the image data, with a higher priority, to the information processing apparatus.

5. An image forming apparatus capable of communicating via facsimile and capable of communicating with an information processing apparatus via a network, the image forming apparatus comprising:
    an input unit that receives input information input by a user, and outputs the input information to a first controller circuit and the first controller circuit that transmits image data transmitted via facsimile, facsimile transmission information including information of one or more items about the facsimile transmission, and additional information including additional information of one or more items about the image data, in association with each other, to the information processing apparatus via the network, the information processing apparatus including a second controller circuit that receives the image data, the facsimile transmission information, and the additional information, in association with each other, from the image forming apparatus via the network, and determines a storage area to store the image data based on information of at least one item out of the information of the one or more items included in the facsimile transmission information and/or based on information of at least one item out of the information of the one or more items included in the additional information, wherein the first controller circuit of the image forming apparatus reads the additional information from the image data by executing optical character recognition on at least a part of the image data, generates the additional information based on the input information input in the input unit by the user, and where additional information of a certain item included in the additional information read from the image data is different from additional information of the certain item included in the additional information generated based on the input information input in the input unit, transmits the additional information of the certain item included in the additional information read from the image data, with a higher priority, to the information processing apparatus.

* * * * *